(12) United States Patent
Van Wuffen

(10) Patent No.: US 10,260,791 B2
(45) Date of Patent: *Apr. 16, 2019

(54) INSULATED CONTAINER

(71) Applicant: Clint Van Wuffen, Phoenix, AZ (US)

(72) Inventor: Clint Van Wuffen, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/911,784

(22) Filed: Mar. 5, 2018

(65) Prior Publication Data
US 2018/0195786 A1 Jul. 12, 2018

Related U.S. Application Data

(63) Continuation of application No. 14/806,540, filed on Jul. 22, 2015, now Pat. No. 9,909,797.

(51) Int. Cl.
| | | |
|---|---|---|
| A45C 11/20 | (2006.01) | |
| F25D 3/06 | (2006.01) | |
| B65D 81/38 | (2006.01) | |
| A23L 3/36 | (2006.01) | |
| B65D 81/26 | (2006.01) | |
| F25D 21/14 | (2006.01) | |

(52) U.S. Cl.
CPC ............... *F25D 3/06* (2013.01); *A23L 3/363* (2013.01); *A23L 3/364* (2013.01); *B65D 81/262* (2013.01); *B65D 81/3813* (2013.01); *F25D 21/14* (2013.01); *F25D 2303/081* (2013.01); *Y02A 40/968* (2018.01)

(58) Field of Classification Search
CPC .................................. A45C 11/20; F25D 3/08
USPC ............................. 220/915.2, 915.1; 62/459
See application file for complete search history.

(56) References Cited

U.S. PATENT DOCUMENTS

| | | | |
|---|---|---|---|
| 4,424,687 A * | 1/1984 | Morgan | F25D 3/08 62/457.1 |
| 2007/0012069 A1* | 1/2007 | Girard | F25D 3/08 62/459 |

* cited by examiner

Primary Examiner — King M Chu
(74) Attorney, Agent, or Firm — Bycer Law, PLC; Matthew L. Bycer

(57) ABSTRACT

The insulated container having an internal support to separate ice, food, and drinks from melted ice water or liquids to prevent damage to the dry items. The dry items are placed on top of the flat upper surface of the removable support. The removable support may include apertures that allow melting ice water to drain past the top surface and through the apertures of the removable support.

14 Claims, 12 Drawing Sheets

INSULATED CONTAINER

CROSS-REFERENCE TO RELATED APPLICATION

The present application is a continuing application of U.S. patent application Ser. No. 14/806,540 filed Jul. 22, 2015, and is related to and claims priority from prior provisional application Ser. No. 61/999,304, filed Jul. 22, 2014, which application is incorporated by reference.

BACKGROUND OF THE INVENTION

1. Field of the Invention

The present invention relates generally to the field of ice chest internal supports and more specifically relates to an insulated container having a removable support.

2. Description of the Related Art

The portable ice chest was invented in the state of Illinois in 1953. Since then, there have been many modifications to improve its functionality and cost of production. Ice chests have also gained widespread popularity in many other countries because of its convenience. The advent of the ice chest enabled people to take perishables and other foods with them on picnics, vacations, and on holidays without the foods spoiling. Many people live at far enough distances from grocery stores that some purchased foods would have a high likelihood of spoiling before reaching home, and as such, the ice chest has become indispensible for that purpose in addition to the aforementioned uses. Generally, ice is placed within the ice chest and beverages are placed among the ice cubes while food is placed on top of the ice cubes to separate it from the water that comes off of the ice as it melts. A common problem with ice chests is that when the ice melts far enough, the food items tend to sink into the ice water and become soaked and therefore inedible. An invention that could keep food items in ice coolers always above the water level from melting ice, but yet in close proximity to the coldest portion of an insulated ice chest, would be a welcomed innovation.

Various attempts have been made to solve the above-mentioned problems such as those found in U.S. Pat. No. 6,698,230 to Dan Brusky, U.S. Publication No. 2015/0014336 to Jose Rosendo Jimenez, and U.S. Patent No. 2012/0151944 to Randy Carlson. This art is representative of ice chest inserts. None of the above inventions and patents, taken either singly or in combination, is seen to describe the invention as claimed.

Ideally, an ice chest insert should be able to maintain food items above a melted ice level to prevent ruining food items by draining the ice water into cavities below the ice, and yet, would operate reliably and be manufactured at a modest expense. Thus, a need exists for a reliable insulated container having a removable support to avoid the above-mentioned problems.

BRIEF SUMMARY OF THE INVENTION

In view of the foregoing disadvantages inherent in the known ice chest insert art, the present invention provides a novel insulated container having a removable support. The general purpose of the present invention, which will be described subsequently in greater detail is to maintain food items above a melted ice level to prevent ruining food items by draining the ice water to cavities below the ice.

The insulated container is an insulated ice chest having a storage space contained by a bottom surface with an area and a perimeter, and a removable support designed to be placed inside the insulated container adjacent and above the bottom surface. The removable support has a top surface with a generally planar shape to support content placed within the container over the bottom surface, and at least a first leg adapted for mating with the bottom surface to maintain a space below the removable support for melted ice water to collect. The support of the insulated container may have a first cylindrical-sectional ridge serving as a first leg and having a first flat portion disposed above, with the top surface also being the first flat portion. A second cylindrical-sectional ridge may serve as a second leg having a second flat portion disposed above, with the top surface also being the second flat portion.

A spine is formed between the first and second ridges along the top surface that has enough flexibility to allow the support to be folded along the spine under compressed or full form. At least one aperture is disposed along the spine that allows water to drain past the top surface into the empty voids below the removable support to keep the melted ice water below, and the ice above, separated.

The insulated container may comprise a hollow bladder adapted to be compressed under lack of internal pressure, and alternately, to expand when inflated. The support further preferably has a first input port disposed along the outer surface of the first cylindrical-sectional ridge for exchange of either gas or liquid to form and release internal pressures within the hollow bladder. To accomplish this, the hollow bladder is made of a flexible and stretchable material. The first input port may be a blow tube adapter adapted to allow either forced air or a liquid to pass into the hollow bladder. A seal in the blow tube adapter has both an open and a closed position with the closed position adapted to prevent exchange of gas or liquid into or out of the bladder. The flexible and stretchable material of the bladder may comprise a resting size such that when the bladder is filled with liquid water and the seal is closed, the liquid water may be frozen and the material stretches to contain the expanded volume of the frozen water. There may be a second input port disposed along the outer surface of a second semi-cylindrical ridge, and in embodiments having a third semi-cylindrical ridge, a third input port may be disposed along the outer surface of the third semi-cylindrical ridge.

The support of the insulated container preferably has a solid planar structure and a hinge adapted to allow the support to be folded. The solid planar structure may have at least two separable panels joined by the hinge but may have more than two separable panels in some embodiments. The storage space is contained by at least a bottom surface having an area defined by a perimeter and the removable support adjacent and above the bottom surface. The removable support has a top surface having a generally planar shape to support content placed within the container over the bottom surface. At least one aperture is formed within the top surface where the support rests adjacent to the bottom surface. The perimeter shape is adapted to mate and to lock in place with a complimentary surface, more specifically, the interior of the insulated container. Alternatively, the removable support preferably is substantially made of foam or some other suitable material having similar characteristics.

A method of storing material within the cooler may have the steps of (1) providing an insulated container having a bottom surface, (2) placing a removable support onto the bottom surface whereby the removable support fits adjacent to the bottom surface, (3) providing at least one aperture in the top surface of the removable support to allow liquid to flow from above the support to the bottom surface below the support, (4) inserting at least one foodstuff into the cooler above the removable support, (5) adding ice above the foodstuff, (6) allowing the added ice to melt whereby the melted ice water flows through the aperture(s) to the bottom surface, and (7) draining the melted ice water from the bottom surface through an outlet port in the insulated container. The method further may comprise the step of inflating the removable support with forced air through a blow port prior to the step of placing it into the insulated container. The step of inflating may include inflating two or more semi-cylindrical ridges having a shared top surface with the aperture formed in a spine(s) between the ridges. The method further may have a step of inflating the removable support with a liquid through a port prior to the step of placing and of freezing the liquid within the removable support, after the step of inflating and before the step of placing.

The insulated container may have a storage space contained by at least a bottom surface having an area and a perimeter, and a support adjacent to and above the bottom surface. The support may have a top surface with a generally planar shape to support content placed within the container over the bottom surface and have at least one aperture formed within the top surface. In one embodiment, the insulated container may further have a hinge coupling attached to an interior wall of the insulated container adapted to allow the support to rotate upwards from the bottom surface. In this embodiment, the removable support is designed so that it can be removed, or it can be left in the insulated container and folded upward out of the way for cleaning.

The present invention holds significant improvements and serves as an insulated container having a removable support. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The various embodiments of the present invention will hereinafter be described in conjunction with the appended drawings, wherein like designations denote like elements.

DETAILED DESCRIPTION

As discussed above, embodiments of the present invention relate to a ice chest insert and more particularly to an insulated container having a removable support as used to separate the melted ice water from the ice and food items in an insulated container.

Generally speaking, the insulated container is an ice chest that has a removable support that separates the ice, food, and drinks from the melted ice water to prevent damage to the food items. The ice, food, and drinks are placed on top of the flat upper surface of the removable support. The removable support has an inflatable bladder on the underside designed to look like downwardly positioned semi-cylindrical ridges, having apertures between the ridges in a foldable spine that allows the melting ice water to drain past the top surface at the edges of the bladder and through the apertures of the removable support into the voids between the semi-cylindrical ridges below.

Figure 1:
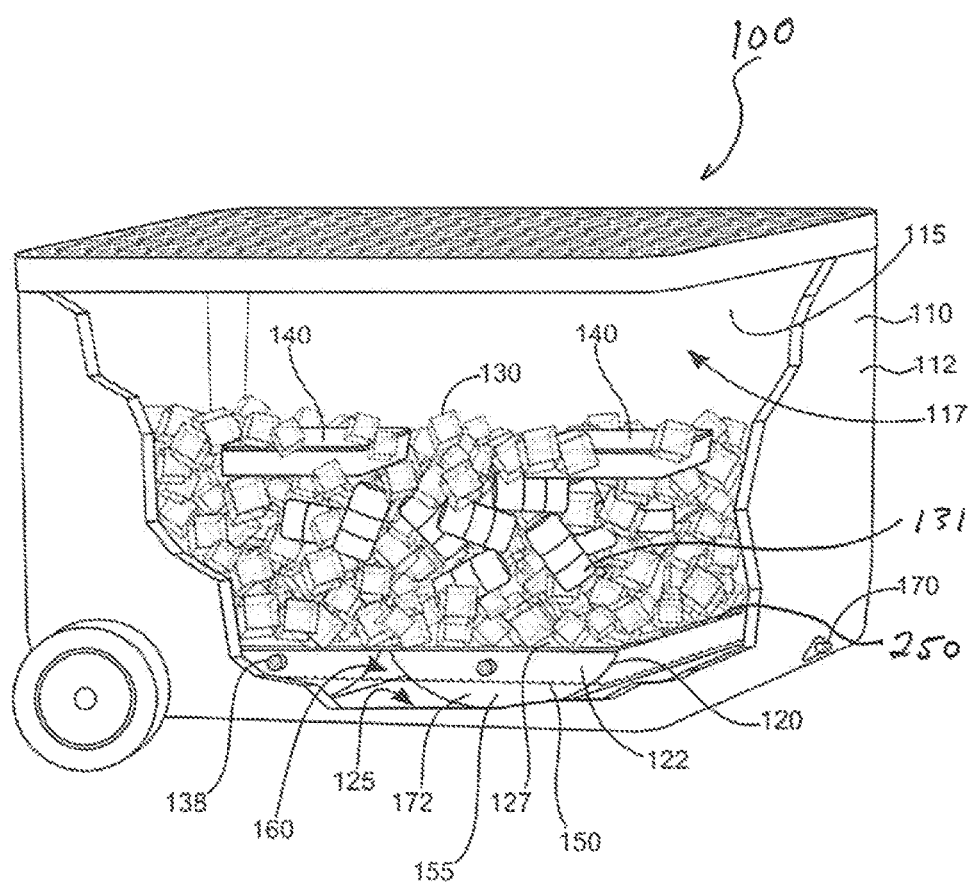
FIG. 1 shows a cutaway perspective view illustrating an insulated container having a removable support according to an embodiment of the present invention.

Referring to the drawings by numerals of reference there is shown in FIG. 1, a cutaway perspective view illustrating insulated container having a removable support 100.

Insulated container 110 is an insulated ice chest 112 having removable support 120 that separates ice 130, drinks, and food items 140 and drinks 131 from melted ice water 150 and drains the melted ice water 150 to voids 160 below removable support 120 and onto bottom surface 125 of insulated container 110 to keep food items 140 dry. Generally, the term foodstuffs can refer to dry or wet food, typically alone or in separable containers such hard of soft containers, or drinks and drinking containers. Melted ice water 150 can be drained from drain port 170 near the bottom of one sidewall 115 of insulated container 110 or may be used as drinking water. Insulated container 110 has storage space 117 contained by bottom surface 125 with an area and a perimeter, and removable support 120 adjacent and above bottom surface 125. Removable support 120 preferably has top surface 127 with a generally planar shape to support content placed within insulated container 110 over bottom surface 125. Removable support 120 preferably has at least two semi-cylindrical ridges 172 downwardly deposed from the flat top surface 127. Semi-cylindrical ridges 172 are preferably inflatable bladders 155. Spaces between semi-cylindrical ridges 172 create voids 160 for collection of melted ice water 150.

Figure 2:
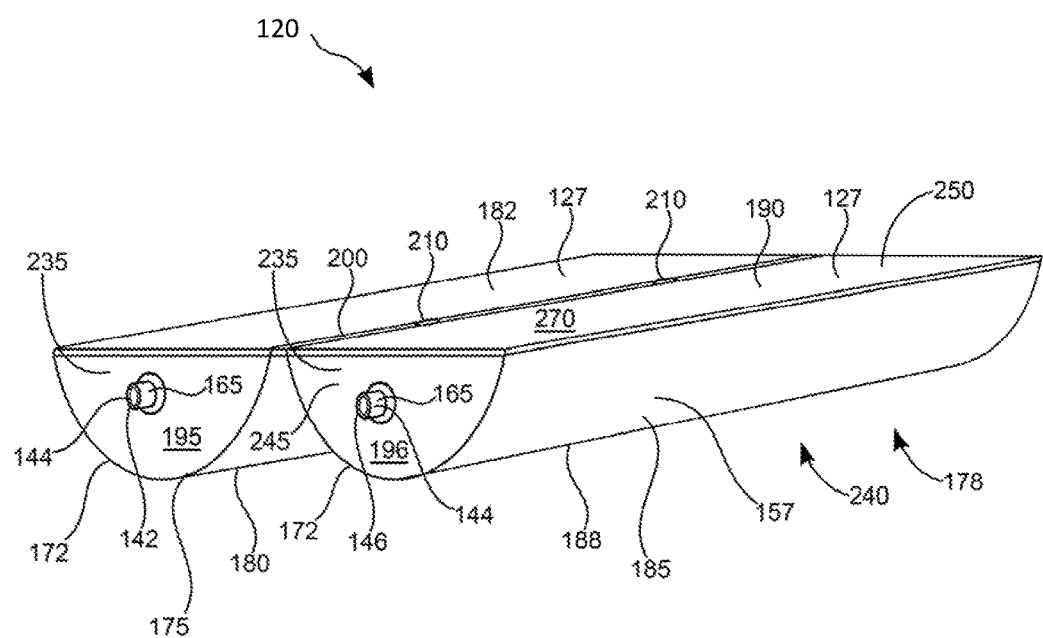
FIG. 2 is a perspective view illustrating a support of the insulated container according to an embodiment of the present invention.

Referring now to FIG. 2, is a perspective view illustrating removable support 120 of insulated container 110.

The support of insulated container 110 may have first cylindrical-sectional ridge 175 serving as first leg 180 having first flat portion 182 disposed above, with top surface 127 also being first flat portion 182. Second cylindrical-sectional ridge 185 may serve as second leg 188 having second flat portion 190 disposed above, with top surface 127 also being second flat portion 190. Ridges may be preferably formed from a complete semi-cylindrical portion. Alternatively, the cylindrical section will suffice for a 90-180 degree arc length. Removable support 120 is a hollow inflatable bladder 155 adapted to be compressed under lack of internal pressure, and alternately, to expand when inflated. Removable support 120 further preferably has first input port 142 disposed along outer surface 122 of first cylindrical-sectional ridge 175 for exchange of either gas or liquid to form and release internal pressures within inflatable bladder 155 which is hollow bladder 157. To accomplish this, hollow bladder 157 is made of a flexible and stretchable material. First input port 142 may be blow tube adapter 144 adapted to allow either forced air or a liquid to pass into hollow bladder 157. Seal 165 in blow tube adapter 144 has both an open and a closed position with the closed position adapted to prevent exchange of gas or liquid into or out of inflatable bladder 155. The flexible and stretchable material of inflatable bladder 155 may comprise a resting size such that when inflatable bladder 155 is filled with liquid water and then seal 165 is closed, liquid water may be frozen and the material stretches to contain the expanded volume of the frozen water.

Figure 3:
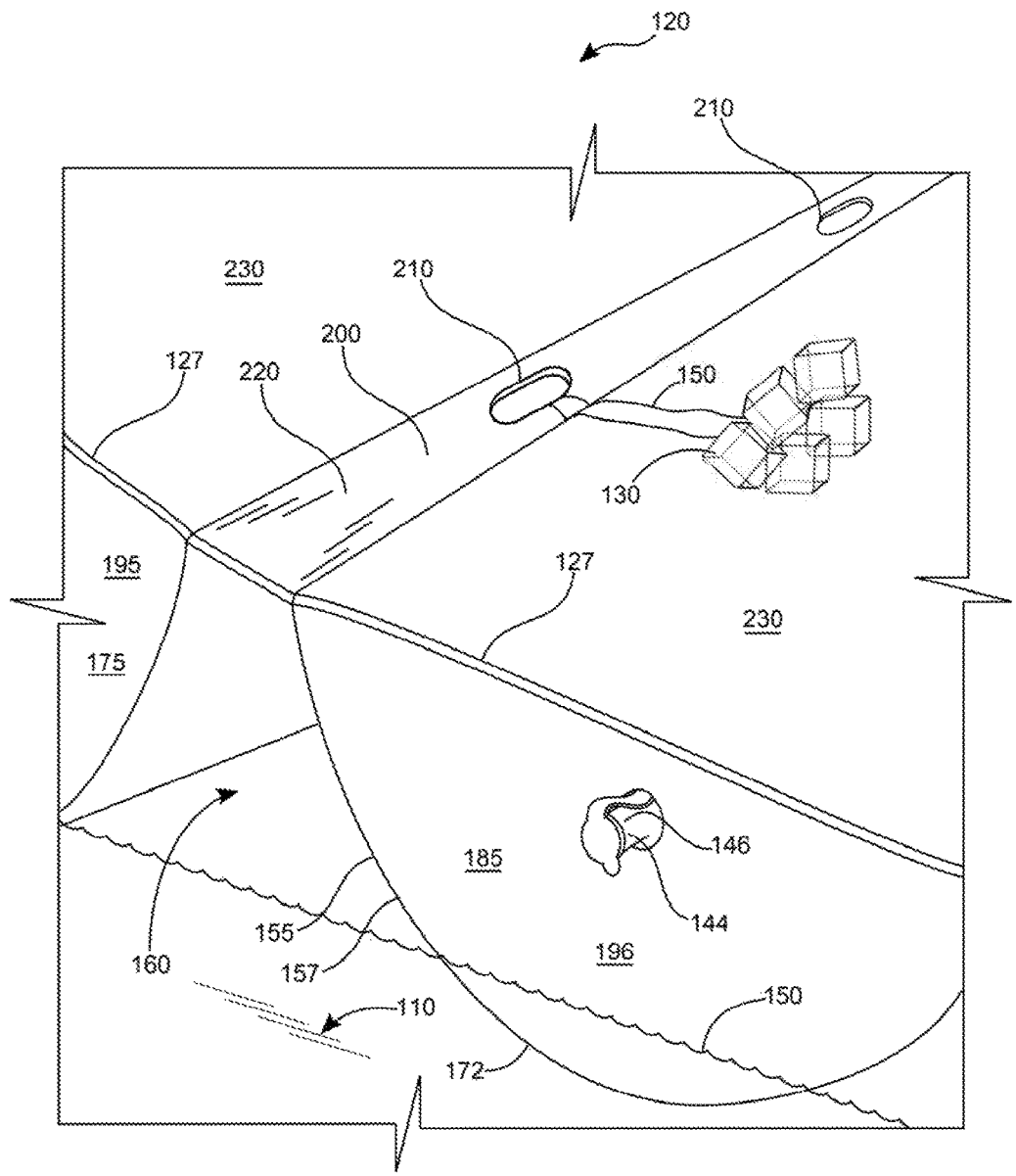
FIG. 3 is a perspective view illustrating a spine and aperture of the removable support of the insulated container according to an embodiment of the present invention.

Referring now to FIG. 3, is a perspective view illustrating spine 200 and aperture 210 of removable support 120 of insulated container 110.

Spine 200 is formed between first 175 and second cylindrical-sectional ridges 185 along top surface 127 that has enough flexibility to allow removable support 120 to be folded along spine 200 under compressed or full form. At least one aperture 210 is disposed along spine 200 that allows melted ice water 150 to drain past top surface 127 into the empty voids 160 below removable support 120 to keep melted ice water 150 below, and ice 130 above, separated. Removable support 120 of the insulated container 110 preferably has a solid planar structure and hinge 220 adapted to allow removable support 120 to be folded. Hinge 220 is spine 200 and allows first flat portion 182 and second flat portion 190 to be folded back to back with inflatable bladders 155 deposed oppositely from each other. The solid planar structure may have two or more separable panel(s) 230 joined by hinge 220. In a preferred embodiment, joint is formed by an extension of material from both the top and bottom of the ridges so that the support can be formed from two separate sheets. The overlapped sheets may form the spine with or without reinforcement, and function to hinge the product at the spine. In an alternative embodiment, the hinge may be made from a separate piece and/or a solid hinge structure. Semi-cylindrical ridges 172 may be deflated and the device folded along spine(s) 200 between semi-cylindrical ridges 172 into a substantially flattened configuration for storage if desired. Spine(s) 200 is preferably constructed of such a resilient and flexible material that allows for folding over a long life without fatigue or damage.

Figure 4A:
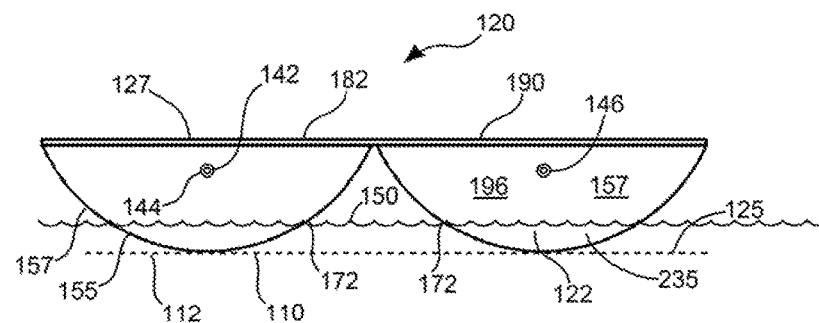
FIG. 4A is a front elevation view illustrating a removable support having two ridges of the insulated container according to an embodiment of the present invention.

Referring now to FIG. 4A is a side elevation view illustrating removable support 120 having two semi-cylindrical ridges 172 of insulated container 110.

Figure 4B:
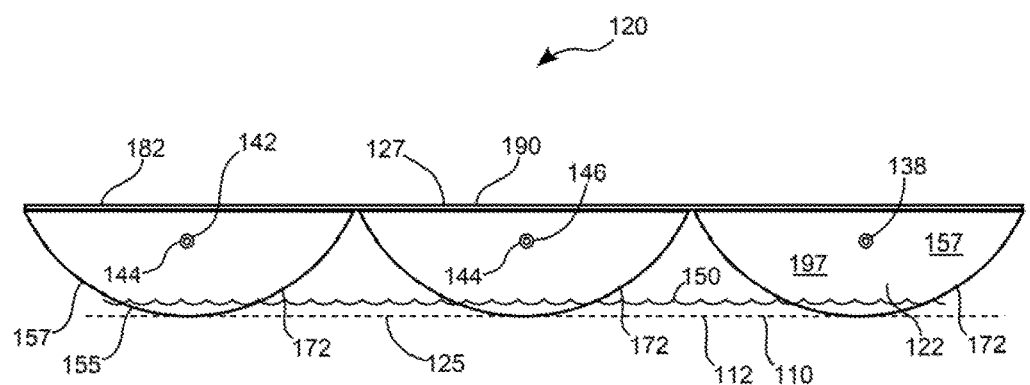
FIG. 4B is a front elevation view illustrating a removable support having three ridges of the insulated container according to an embodiment of the present invention.

There may be second input port 146 disposed along outer surface 235 of second semi-cylindrical ridge 196 and in embodiments having third semi-cylindrical ridge 197 and third input port 138 as seen in FIG. 4B, that may be disposed along outer surface 122 of third semi-cylindrical ridge 197. The perimeter shape is adapted to mate and to lock in place with a complimentary surface, more specifically, the interior of insulated container 110. Removable support 120 is preferably made of foam, flexible plastic, or other suitable material having similar characteristics. The removable support having two semi-cylindrical ridges 172 would typically be used with small sized insulated containers 110, for instance, containers having a capacity of about twenty-five quarts. The number of semi-cylindrical ridges 172 may generally be associated with given range of cooler capacities, however, semi-cylindrical ridges 172 may be manufactured in various widths or heights and as such, a particular capacity of insulated container 110 may have more or less semi-cylindrical ridges 172 in some embodiments. The essence of the invention is the geometry of removable support 120, and not necessarily the relative size or number of semi-cylindrical ridges 172.

Referring now to FIG. 4B is a side elevation view illustrating removable support 120 having three semi-cylindrical ridges 172 of insulated container 110.

Removable support 120 has top surface 127 having a generally planar shape to support content placed within insulated container 110 over bottom surface 125. At least one aperture 210 is formed within top surface 127 where removable support 120 rests adjacent to bottom surface 125. This embodiment is preferably a single piece of plastic, foam or vinyl material (e.g. 40-gauge), the same material that traditional outdoor mattresses and rafts are made from. Once the device is blown up (or filled with water and frozen overnight) hollow bladder 157 can then be inserted into another ice chest 112 or insulated container 110 in fine conformation in fit form function to allow food inside of cooler to store properly without becoming wet from melted ice water 150.

Figure 5A:
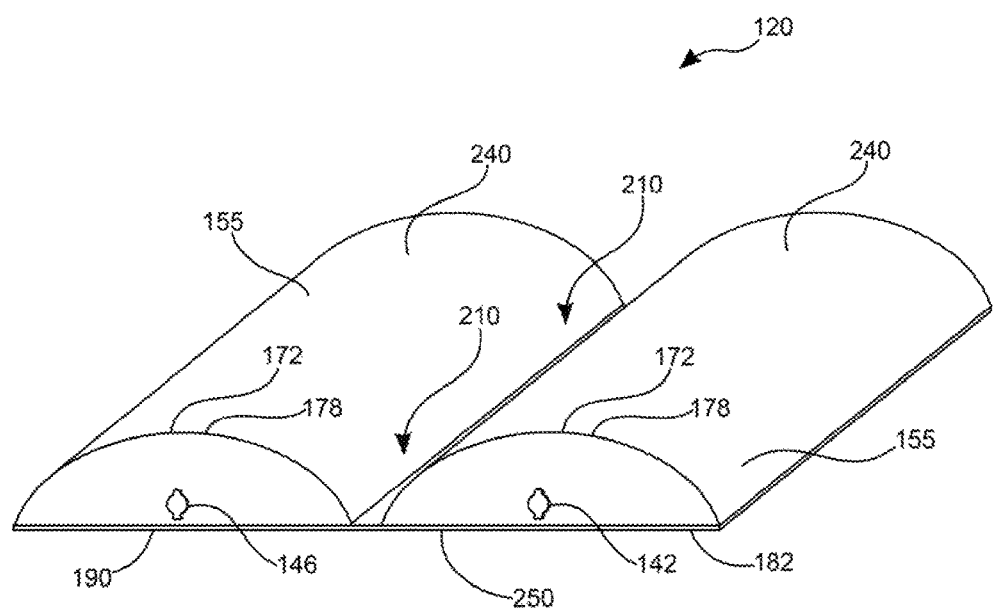
FIG. 5A is a bottom view illustrating the removable support of the insulated container according to an embodiment of the present invention.

Referring now to FIG. 5A is a bottom view illustrating removable support 120 of insulated container 110.

In one preferred embodiment, underside 240 of removable support 120 is designed to fit flush at the corners of the traditional ice chest 112 so that melted ice water 150 can drain through aperture(s) 210, or, in alternative embodiments, it is designed to fit the corners and sides in such a way that water can drain through apertures and/or along the side(s) and at the corners to the water collection chambers below flat top-side 250. Melted ice water 150 will collect at bottom surface 125 of ice chest 112 in between semi-cylindrical ridges 172. This inflatable bladder 155 upon being pressurized is self-supporting to carry a load on its flat top-side 250 while resting on support legs 178 (which may be bumps or semi-cylindrical ridges 172) of bottom-space on underside 240 and conforming in and to ice chest 112 of product-containment. Inflatable bladder 155 upon inflation would take on the conformation of ice chest 112 in presenting a flat surface for a load of produce and or ice while supporting itself on bottom surface 125 of ice chest 112 with a bottom-cavity-volume for melted ice water 150 for drainage or containment of potable water. Removable support 120 is a piece of high density sturdy plastic or vinyl that can be blown up with air, like a balloon. After blowing up removable support 120 with air simply seal semi-cylindrical ridge 172 that you blow the air through just like a blow up pool raft. Once fully inflated the device is manually placed inside of insulated container 110. After the food and drink have been inserted into the ice chest 112 and on top surface 127 of removable support 120 the user can place ice 130 inside of ice chest 112 and around the contents to keep the contents cold. When ice 130 begins to melt and transfers energy into water it will naturally melt to bottom surface 125. As ice 130 transfers energy melting into water it slowly drains to bottom surface 125 of ice chest 112. The support geometry humps keep the food and ice inches from bottom surface 125 which acts as agent to ice chest 112. The removable container may also be filled with water and sealed, and then frozen and placed within insulated container 110 and then ice 130, drinks, and food items placed on top of it. The frozen ice filled inflatable bladder 155 would aid in slowing the heat transfer and melting of the ice 130 which would then drain around the edges and through aperture(s) 210 to voids 160 between semi-cylindrical ridges 172.

Figure 5B:
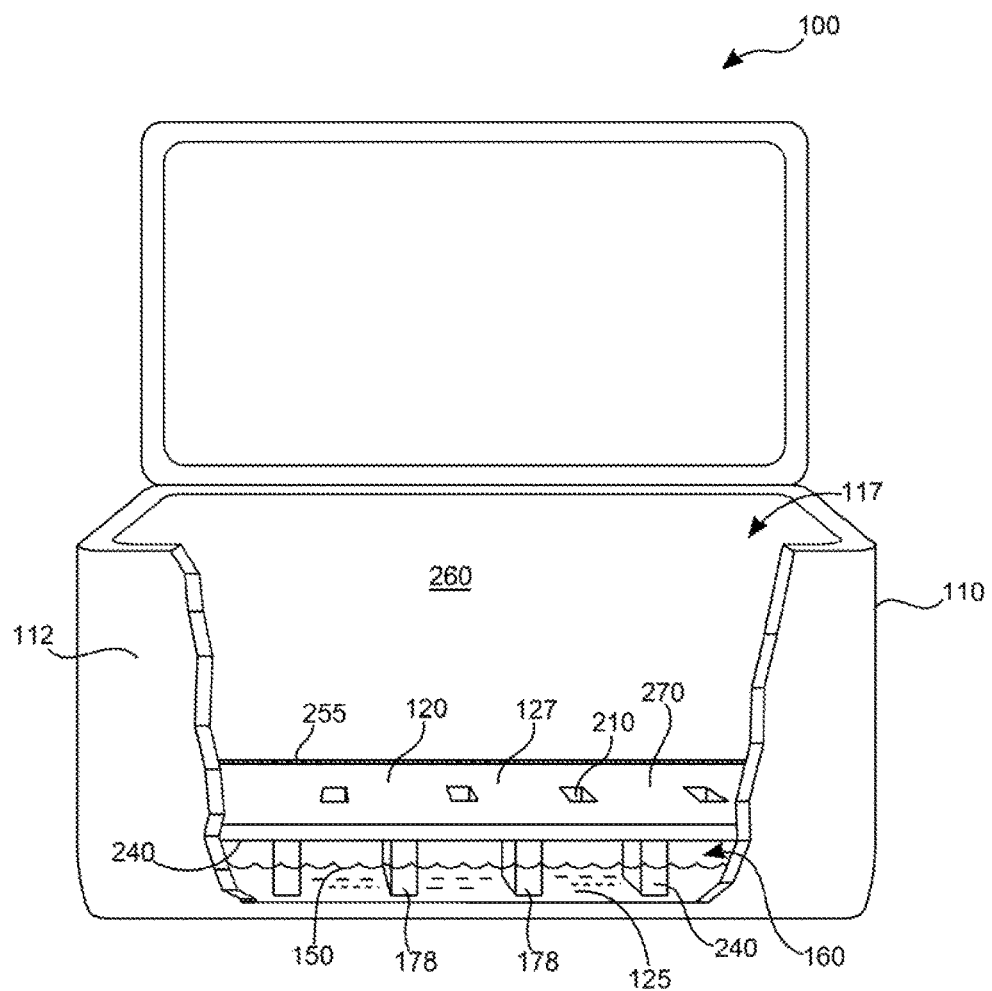
FIG. 5B is a front cutaway elevation view of an alternate embodiment of the insulated container according to an embodiment of the present invention.

Referring now to FIG. 5B is a front cutaway view of an alternate embodiment of insulated container 110.

In this embodiment, insulated container 110 may have storage space 117 contained by at least bottom surface 125 having an area and a perimeter, and support 120 adjacent to and above bottom surface 125. Support 120 may have a top surface 127 with a generally planar shape as in other embodiments, to support content placed within insulated container 110 over bottom surface 125 and have at least one aperture(s) 210 formed within top surface 127 for draining melted ice water 150. Insulated container 110 may further have hinge coupling 255 along one interior wall surface 260 of insulated container 110 that support 120 pivotally couples to. Hinge coupling 255 is adapted to allow support 120 to rotate upwards from bottom surface 125. Support 120 in this embodiment may not be inflatable but rigid and have a plurality of support legs 178 for maintaining the space below support 120. For cleaning, support 120 may be pivoted upward. Support 120 is preferably removable, but may also be manufactured with the support non-removable, or attached to the wall and/or bottom via hinge. Also in this embodiment, support legs 178 may fold and snap into a planar position with support 120 when in the upward rotated position. Support 120 may be constructed of a high density sturdy plastic and have more than one size of support legs 178 that are able to be rotated downward to maintain a space between support 120 and bottom surface 125 of insulated container 110. The larger sized support legs 178 provide greater support, but less water storage space 117. The smaller sized support legs 178 provide less support strength, but greater storage space 117 for melted ice water 150. When rotated planar with support 120 top surface 127, support legs 178 can be snapped into place.

Figure 7:
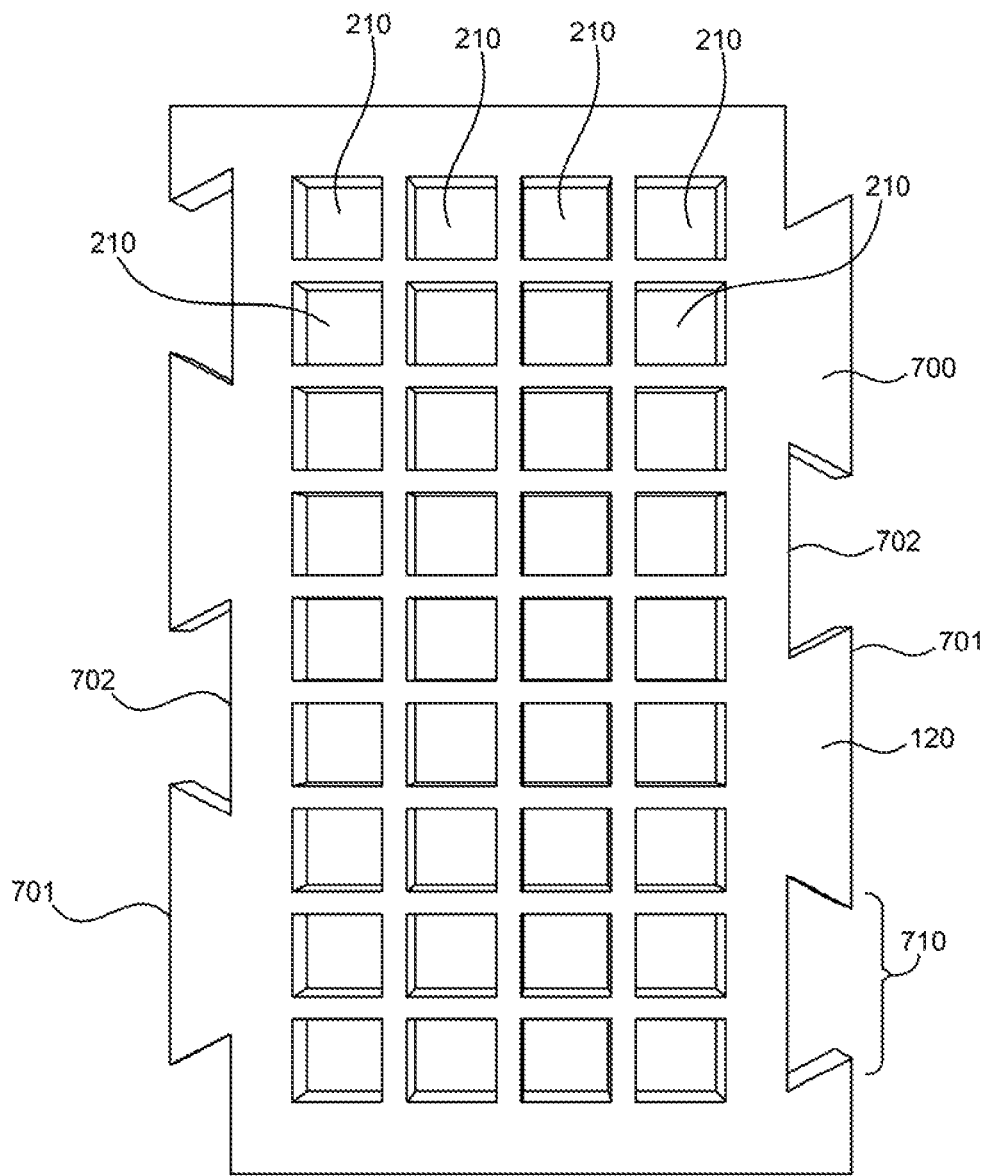
FIG. 7 demonstrates a top view of a support of the present invention.
Figure 8:
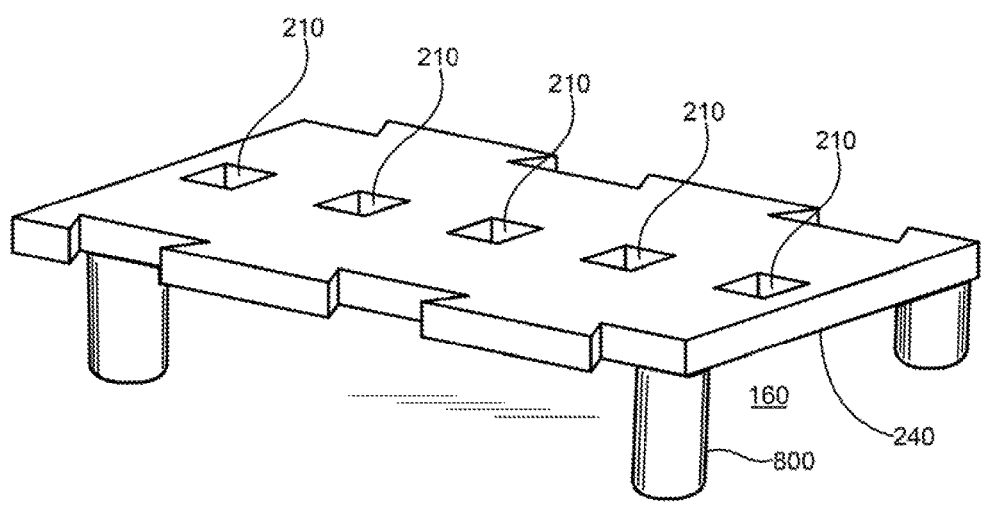
FIG. 8 demonstrates a perspective view of the embodiment of the support shown in FIG. 7.

In another embodiment as shown in FIGS. 7 and 8, removable support 120 may be constructed of high density foam having a plurality or array of aperture(s) 210 allowing for drainage. As shown in FIG. 8, the high density foam may have integrally formed protrusions 800 on underside 240 that contact bottom surface of insulated container to maintain voids 160 between the protrusions for collecting melted ice water. Protrusions 800 may be shaped as cylindrical posts or legs for supporting the support 120. Foam body 700 may also comprise an outer edge 710 with interlocking features such as male stub 701 and complimentary female indent 702 to allow the support to be joined by adjacent features, such as a similar support, such that the total support can be customized for the size and shape of the insulated container.

In yet another embodiment, removable support 120 may be constructed of sturdy high density foam having support legs 178 on each end for maintaining voids 160 for collection of melted ice water 150. Platform 270 in this embodiment is rigid enough that center support legs may not be required.

Figure 9:
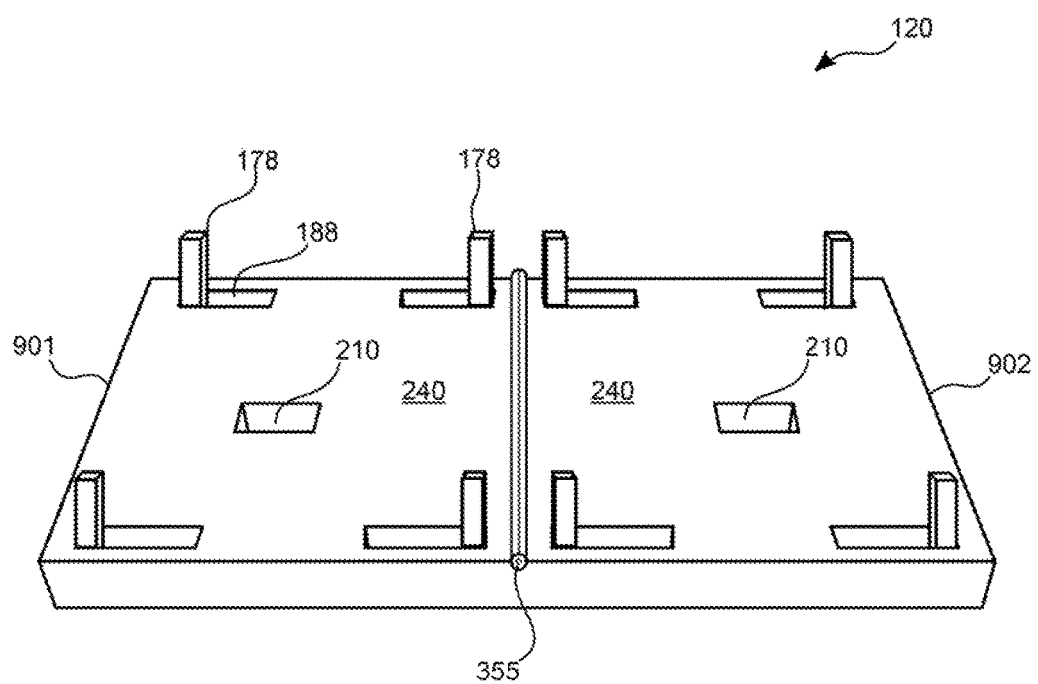
FIG. 9 demonstrates an underside perspective view of a support of the present invention.
Figure 10:
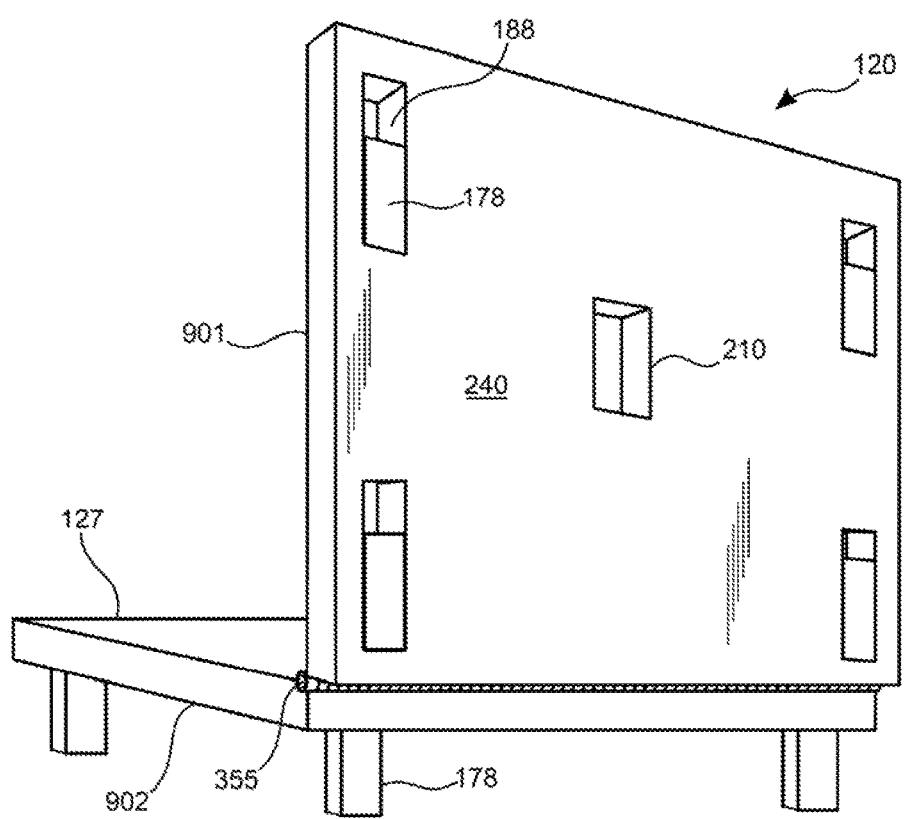
FIG. 10 demonstrates a perspective view of a support of the present invention.

As shown in FIGS. 9 and 10, support 120 with apertures 210 may comprise foldable support legs 178 may collapse into leg recesses 188 to lay flush with underside 240 (shown in FIG. 10). Support 120 may have center, or otherwise placed hinge 355 to allowable separable support ends 901 and 902 to fold together. Depending on location of hinge 355, support 120 can fold upwards (leaving legs exposed as shown in FIG. 10) or arranged as shown in FIG. 9 to leave top surface 127 exposed when folded.

Figure 11A:
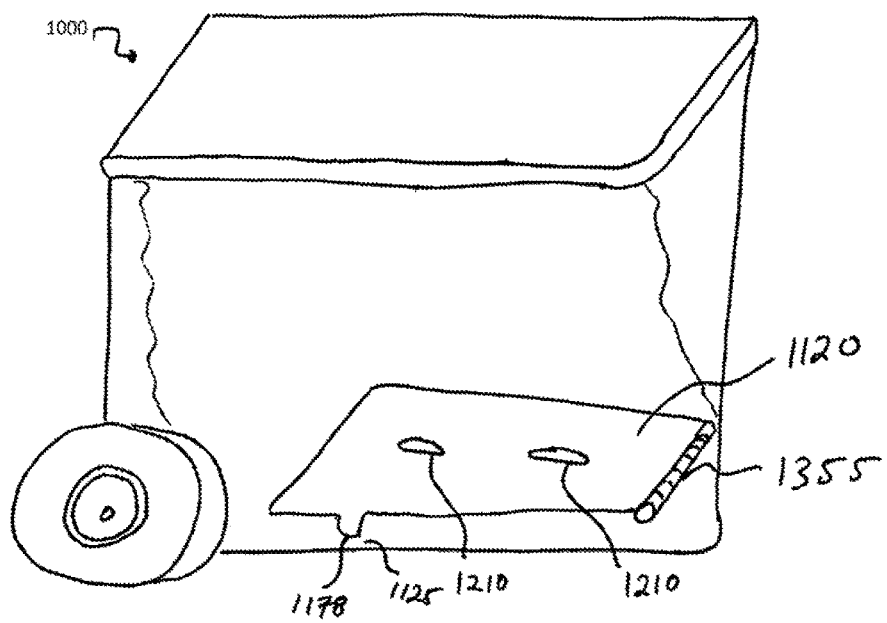
FIG. 11A demonstrates a cut-away perspective of a resting support of the present invention.
Figure 11B:
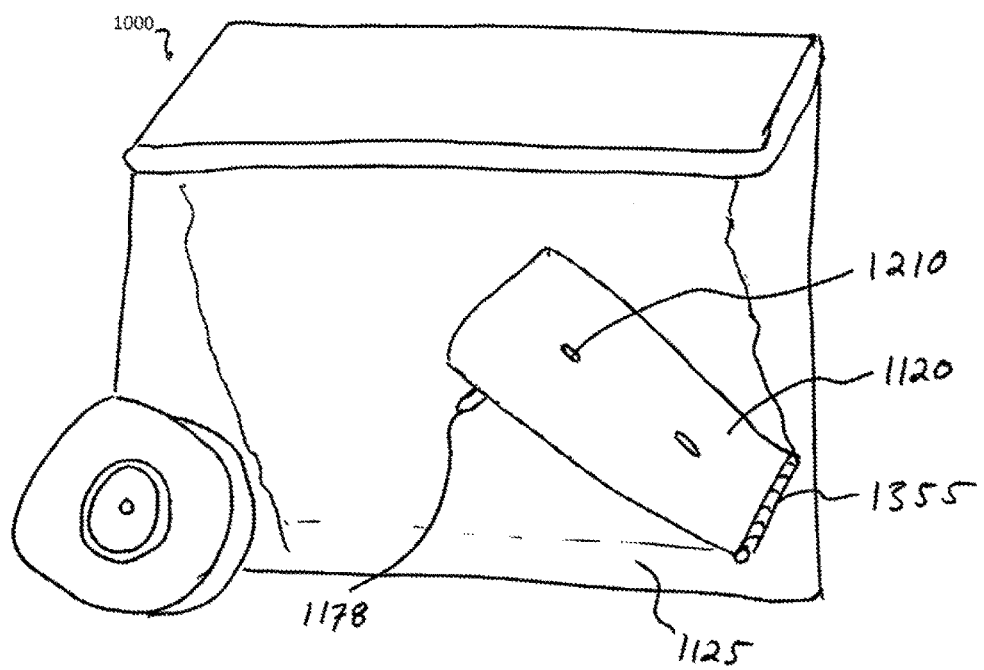
FIG. 11B demonstrates a cut-away perspective of an elevated support of the present invention as shown in FIG. 11A.

FIG. 11A-B demonstrates container 1000 built-in support 1120 with apertures 1210 connected to the bottom, or wall, or corner of container interior via hinge 1355 molded or permanently affixed to container 1000. As shown in FIG. 11A, built-in support 1120 may be rested on the container bottom interior 1125 and held in place by support leg 1178 or a plurality of support legs. In a preferred embodiment, support leg 1178 may stand alone as a long extending bar or bars to hold up most of support from bottom of container. Support leg may snap into complimentary features, as known in the art, to secure support in resting position. As shown in FIG. 11B, built-in support 1120 may be lifted by rotating upwards along hinge axis to provide access to the bottom 1125 for cleaning, etc.

In each embodiment, removable support 120 is manually placed inside insulated container 110 and ice 130, drinks, and/or food items 140 placed on top surface 127 of removable support 120 to be kept cold. In embodiments with semi-cylindrical ridges 172, generally the size of ice chest 112 or insulated container 110 will dictate the number of semi-cylindrical ridges 172. For example, a 50 quart insulated container 110 may have removable support 120 with 3 semi-cylindrical ridges 172, a 100 quart container may have a support with 4 semi-cylindrical ridges 172, and a 150 quart container may have 5 semi-cylindrical ridges 172. The number of semi-cylindrical ridges 172 may be generally dictated by the size of ice chest 112 but may vary based on preference, cost of manufacturing, or other engineering considerations.

Figure 6:
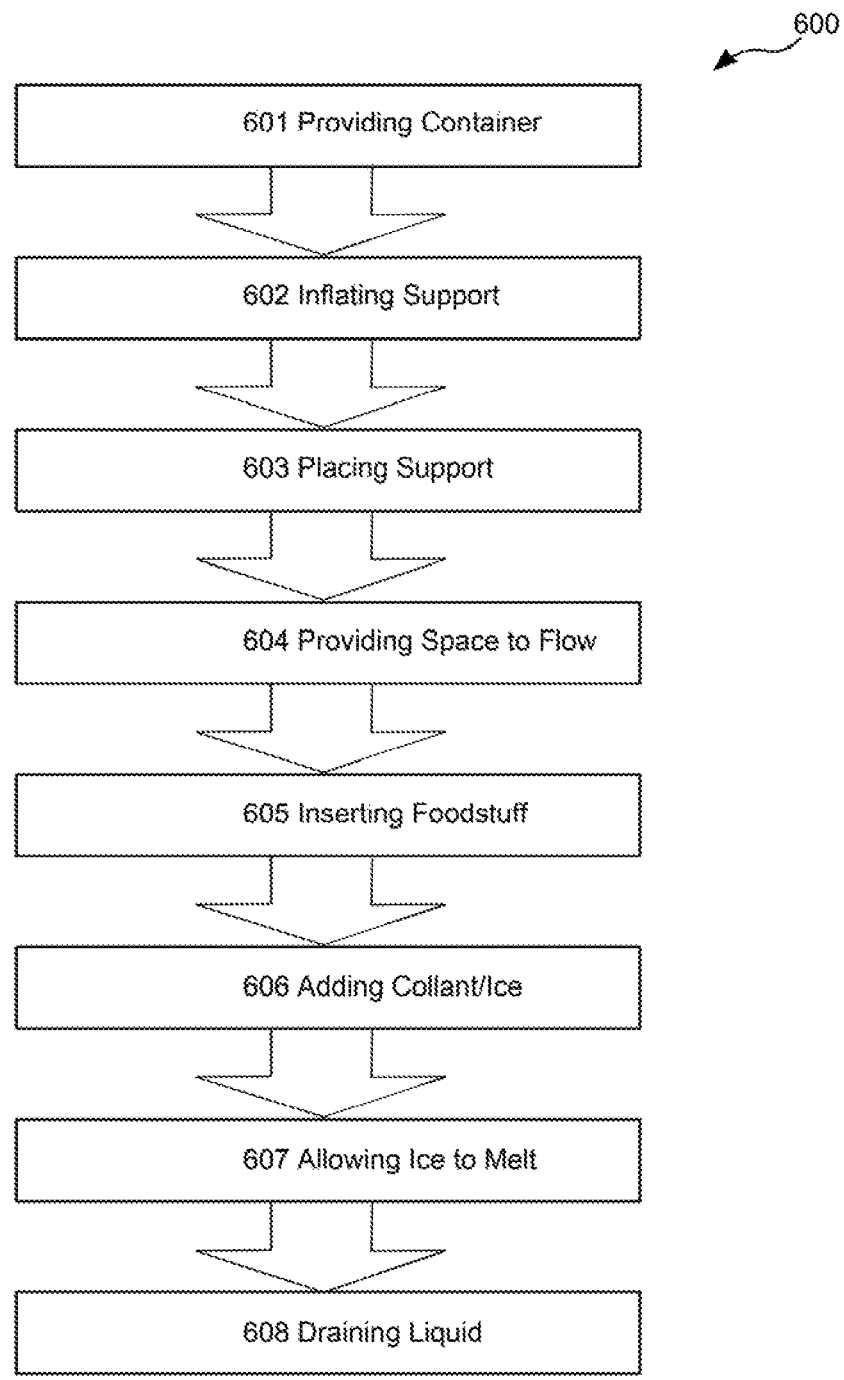
FIG. 6 showing a flowchart illustrating a method of use of the insulated container according to an embodiment of the present invention.

Referring now to FIG. 6 showing a flowchart illustrating method 600 of storing material within insulated container 110.

Method 600 of storing material within the insulated container 110 having removable support 100 may comprise the steps of step one, providing 601 insulated container 110 having bottom surface 125. Method 600 further may comprise step two, inflating 602 removable support 120 with forced air through blow tube adapter 144 prior to the step of placing it into insulated container 110. The step of inflating may include inflating two or more semi-cylindrical ridges 172 having a shared top surface 127 with aperture(s) 210 formed in spine(s) 200 between semi-cylindrical ridges 172. In step eight 608, method 600 further may have a step of inflating removable support 120 with a liquid through blow tube adapter 144 prior to the step of placing and of freezing the liquid within removable support 120 after the step of inflating and before the step of placing.

Step three, placing 603 removable support 120 onto bottom surface 125 whereby removable support 120 fits adjacent to bottom surface 125; step four providing at least one aperture(s) 604 to liquid to flow from above to below the support, wither at the edges, corners, and/or through apertures 210 in top surface 127 of removable support 120 to allow melted ice water 150 to flow from above removable support 120 to bottom surface 125 below removable support 120; step five inserting at least one foodstuff 605 into insulated container 110 above removable support 120; step six, adding 606 ice 130 or other coolant above food items 140; step seven, allowing the added ice 130 to melt 607 whereby melted ice water 150 flows through aperture(s) 210 to bottom surface 125; and step eight, draining 608 melted ice water 150 from bottom surface 125 through drain port 170 in insulated container 110. It should be noted that step of inserting 605 is an optional step and may not be implemented in all cases.

Insulated container having a removable support 100 may be sold as kit 250 comprising the following parts: at least one insulated container 110; at least one removable support 120; and at least one set of user instructions. The kit has instructions such that functional relationships are detailed in relation to the structure of the invention (such that the invention can be used, maintained, or the like in a preferred manner). Insulated container having a removable support 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient. The insulated container can be envisioned as a typical cooler box, but the support may also be fitted into other insulated containers featuring a bottom and, preferably, at least one side. For instance, the support can be used in a sink, freezer/refrigerator, pop-up tents, etc. The support may contain obvious apertures, but may also comprise a screen or grid.

The embodiments of the invention described herein are exemplary and numerous modifications, variations and rearrangements can be readily envisioned.

I claim:

1. An insulated container comprising:
   a. a storage space contained by at least a bottom surface; and
   b. a removable support adjacent and above said bottom surface, said removable support comprising:
      i. a top surface having a generally planar shape to support content placed within said container over said bottom surface; wherein said top surface comprises a first flat portion, and a second flat portion adjacent said first flat portion;
      ii. a spine formed between said first and second flat portions, said spine providing flexibility to allow said removable support to be folded along said spine;
      iii. at least one aperture disposed along said spine; and
      iv. at least a first leg adapted for mating with said bottom surface.

2. The insulated container of claim 1, wherein said removable support comprises:
   a. a first cylindrical-sectional ridge serving as said at least a first leg, whereby said first flat portion is disposed above said first cylindrical-sectional ridge;
   b. a second cylindrical-sectional ridge serving as a second leg, whereby said second flat portion is disposed above said second cylindrical-sectional ridge.

3. The insulated container of claim 2, wherein said removable support comprises a hollow bladder adapted to compress under lack of internal pressure and to expand when inflated, said removable support further comprising a first input port disposed along an outer surface of said first cylindrical-sectional ridge for exchange of gas or liquid to form and release internal pressures within said hollow bladder.

4. The insulated container of claim 3 wherein said first input port comprises a blow tube adapter adapted to allow forced air to pass into said hollow bladder, said blow tube adapter comprising a seal having an open and closed position, said closed position adapted to prevent exchange.

5. The insulated container of claim 4 wherein said first input port comprises an inlet adapted to allow liquid to flow into said hollow bladder, said inlet comprising a seal having an open and closed position, said closed position adapted to prevent exchange.

6. The insulated container of claim 5 wherein said flexible and stretchable material comprises a resting size, such that when the bladder is filled with a liquid water and said seal is closed, the liquid water may be frozen wherein said material stretches to contain the expanded volume of the frozen water.

7. The insulated container of claim 3 further comprising a second input port disposed along an outer surface of said second semi-cylindrical ridge.

8. An insulated container comprising:
   a. a storage space contained by at least a bottom surface; and
   b. a removable support adjacent and above said bottom surface, said removable support comprising:
      i. a top surface having a generally planar shape to support content placed within said container over said bottom surface;
      ii. at least one aperture formed within said top surface;
      iii. whereby said support rests adjacent to said bottom surface; and
      iv. at least one leg emanating from below said top surface and adapted to mate with said bottom surface; wherein said removable support comprises at least two separable panels joined by a hinge.

9. The insulated container of claim 8, wherein said at least one leg is coupled with said removable support, said removable support further comprising an underside having recess adapted to fit said at least one leg when said at least one leg is replaced within said underside.

10. The insulated container of claim 8, wherein each of said at least two separable panels comprises an aperture through said top surface.

11. The insulated container of claim 8, wherein said at least two separable panels comprises a first panel and a second panel, and wherein said first panel comprises a first leg, and wherein said first leg is coupled with said first panel, and wherein said first panel further comprises a first underside having recess adapted to fit said first leg when said first leg is replaced within said first underside.

12. The insulated container of claim 11, wherein said second panel comprises a second leg, and wherein said second leg is coupled with said second panel, and wherein said second panel further comprises a second underside having recess adapted to fit said second leg when said second leg is replaced within said second underside.

13. An insulated container comprising:
   a. a storage space contained by at least a bottom surface, said bottom surface comprising at least one interior surface-; and
   b. a support adjacent and above said bottom surface, said support comprising:
      i. a top surface having a generally planar shape to support content placed within said container over said bottom surface;
      ii. at least one aperture formed within said top surface;
      iii. a hinge coupled between said support and said at least one interior surface;
      iv. whereby said support rests adjacent to said bottom surface; and
      v. at least one support leg emanating from below said top surface and adapted to mate with said bottom surface.

14. The insulated container of claim 13, wherein said support comprises at least one recess adapted to allow said at least one support leg to collapse into said at least one recess.

* * * * *